United States Patent

Tung

Patent Number: 6,065,984
Date of Patent: May 23, 2000

[54] CARD CONNECTOR WITH RETRACTABLE PUSH BUTTON ATTACHED TO PUSH ROD OF EJECTOR MECHANISM

[76] Inventor: Shun-Chi Tung, 930 W. Maude Ave., Sunnyvale, Calif. 94086

[21] Appl. No.: 09/104,939

[22] Filed: Jun. 25, 1998

[30] Foreign Application Priority Data

Jun. 25, 1997 [TW] Taiwan ................................ 86210604

[51] Int. Cl.$^7$ .................................................. H01R 13/62
[52] U.S. Cl. .......................................................... 439/159
[58] Field of Search .................................... 439/152, 159, 439/160

[56] References Cited

U.S. PATENT DOCUMENTS 5,558,527  9/1986  Lin .......................................... 439/155
5,730,610  3/1998  Hsia et al. .............................. 439/160

FOREIGN PATENT DOCUMENTS 82102557  4/1993  Taiwan .
82109139  10/1993  Taiwan .
83107162  10/1993  Taiwan .

Primary Examiner—Steven L. Stephan
Assistant Examiner—Barry M.L. Standig

[57] ABSTRACT

A retractable mechanism for use with a push rod of a card cartridge connector comprises a first member adapted to be assembled to an end of a push rod, and a second member receiving the first member in a recess defined therein. Positioning means selectively positions the second member between a first position in which the length of the push rod is extended and a second position in which the length of the push rod is unchanged. The positioning means includes an elongate groove defined on an outer surface of the first member. The groove forms a traverse portion having a notch offset from the groove. The second member defines a hole in which a guiding pin is inserted. The guiding pin projects into the groove when the first member is received in the recess of the second member.

6 Claims, 10 Drawing Sheets

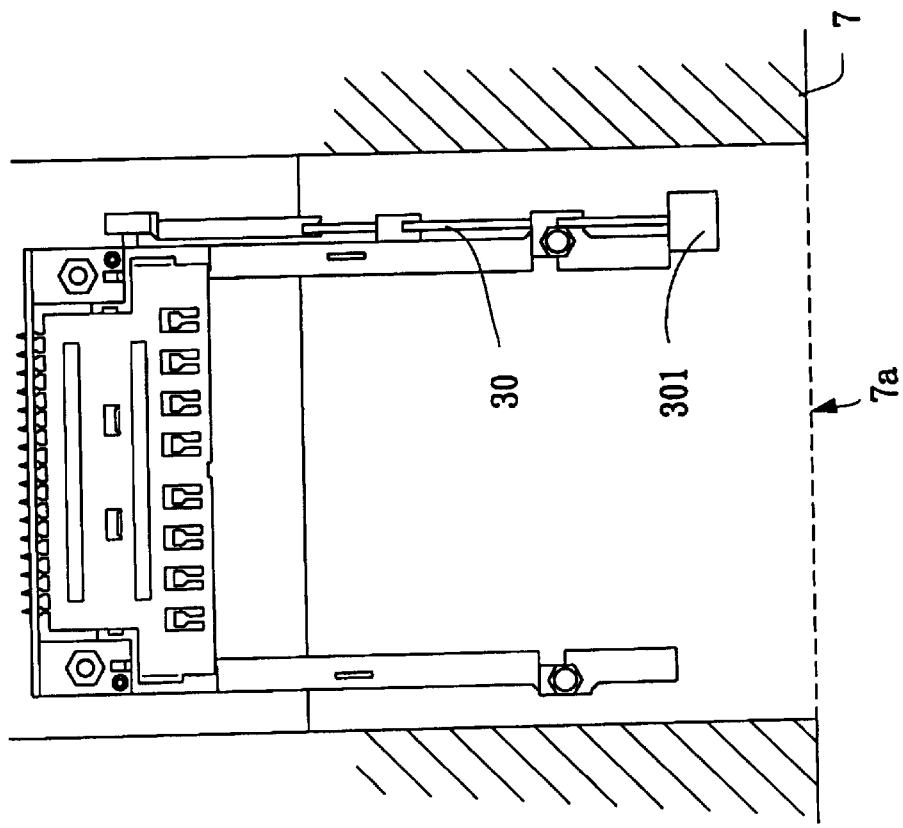
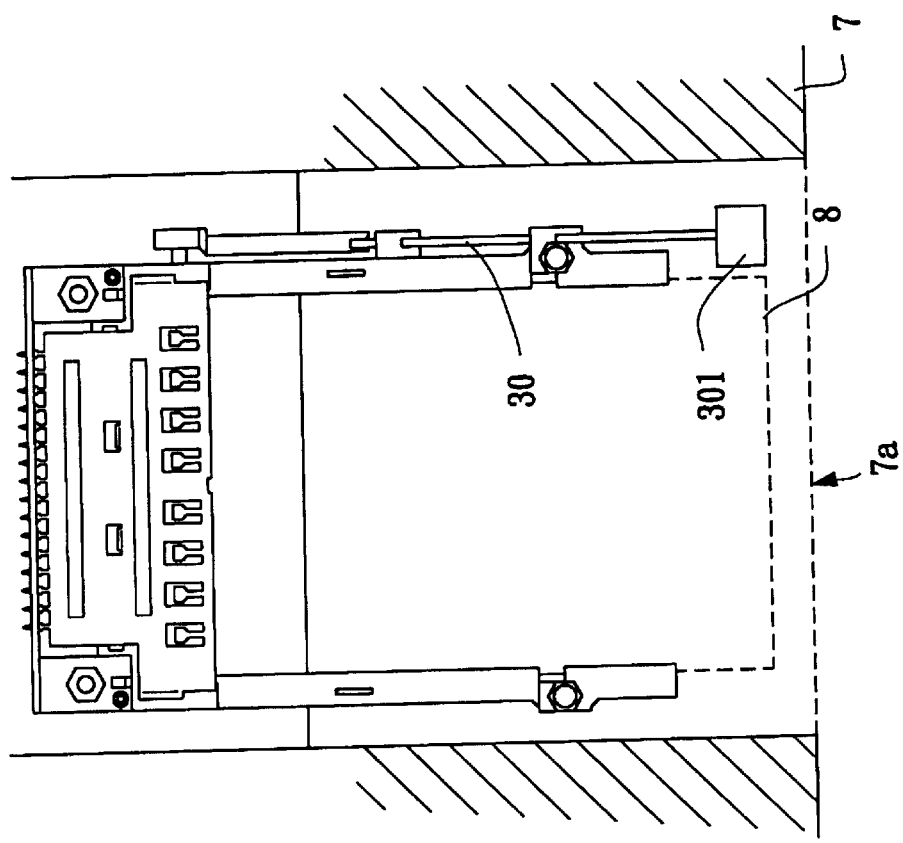

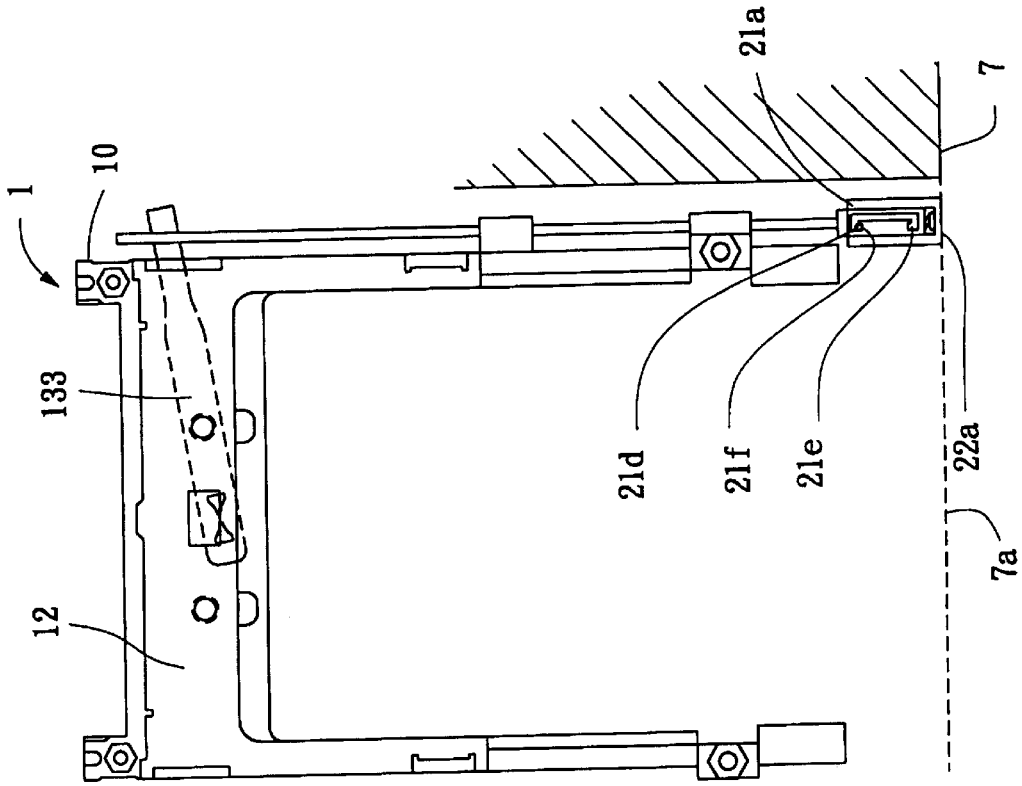
FID. 5B
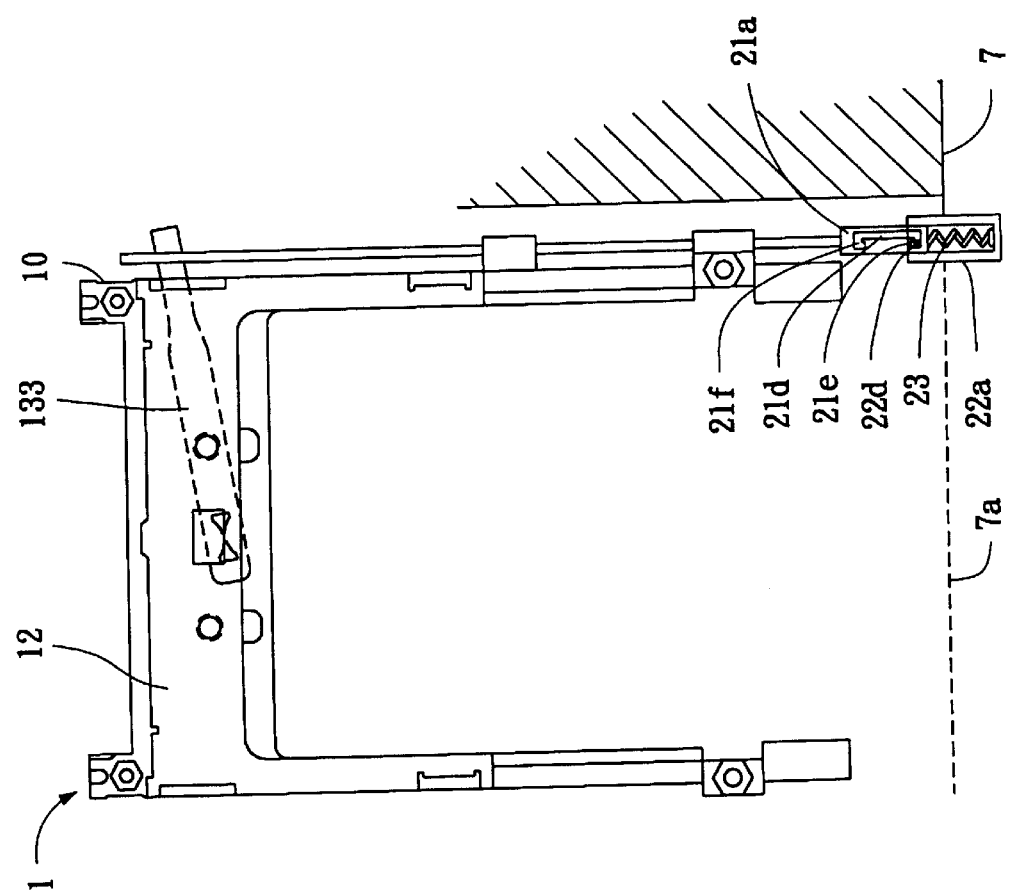
FIG. 5A

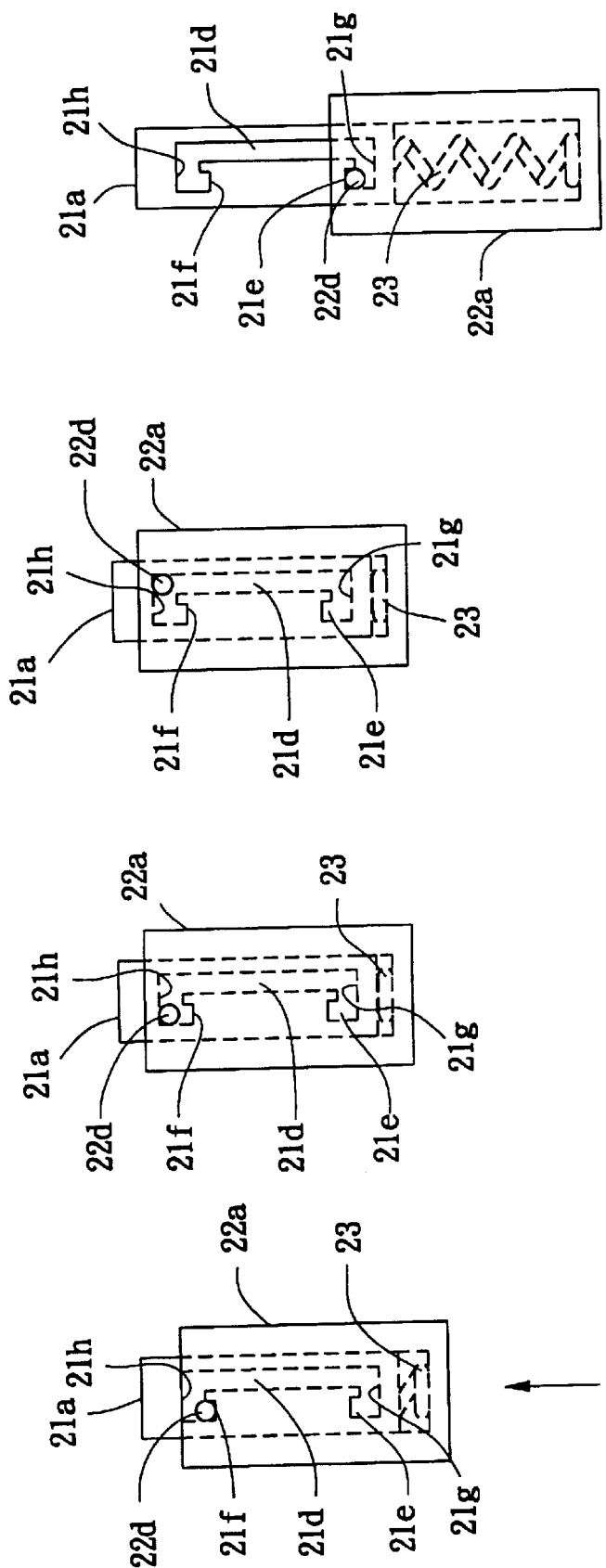

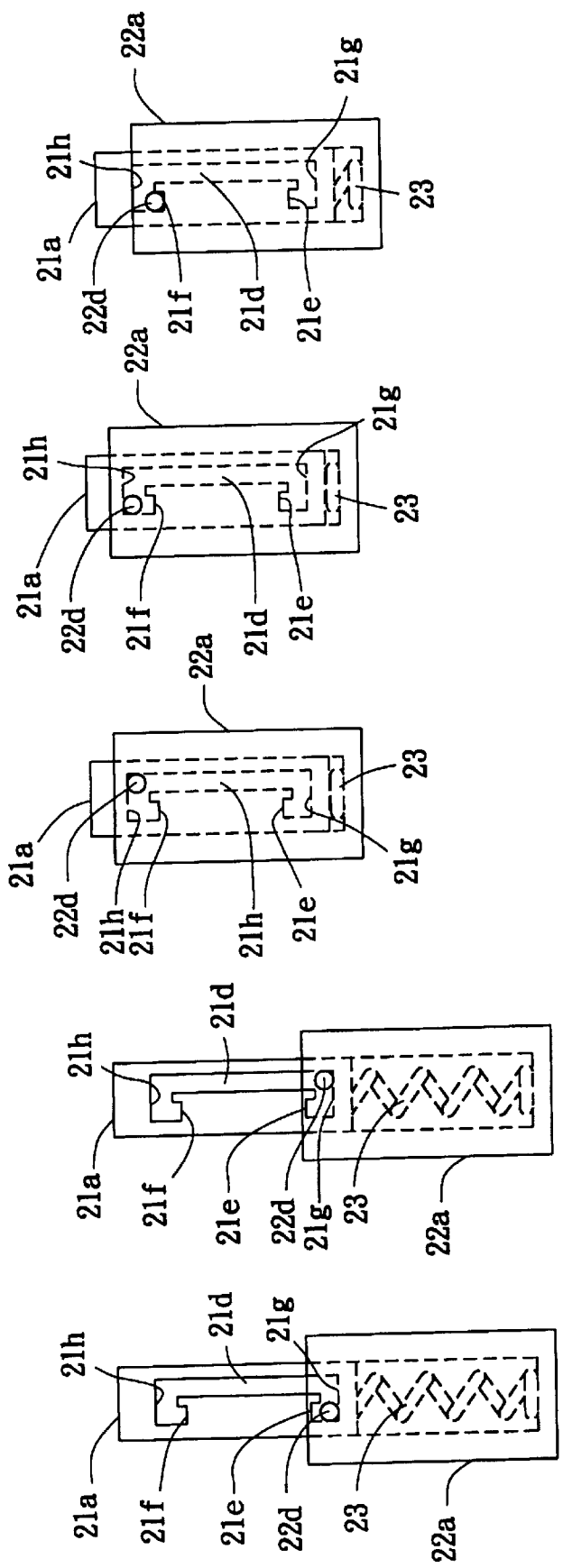

6,065,984

CARD CONNECTOR WITH RETRACTABLE PUSH BUTTON ATTACHED TO PUSH ROD OF EJECTOR MECHANISM

FIELD OF THE INVENTION

The present invention relates to a retractable mechanism, and more particularly to a retractable mechanism for use with a push rod whereby the length of the push rod can be extended when the retractable mechanism is actuated.

DESCRIPTION OF PRIOR ART

Portable computers are all equipped with at least a built-in card cartridge connector for receiving an electrical card therein. A card ejecting mechanism is integrally assembled to the connector to eject an inserted card. Taiwan Utility Patent Application Nos. 82102557, 82109139, 83107162, and U.S. Pat. Nos. 5,324,204, 5,383,789, and 5,421,737 disclose such subject matter.

Referring to FIG. 1, a conventional card ejecting mechanism 3 for use with a card cartridge connector generally comprises a pair of guiding pillars 30, a bridging bracket 33 disposed between the guiding pillars 30, an ejecting tab 31 movably assembled to the bridging bracket 30, a biasing tab 32 pivotably supported on the ejecting tab 31 and abutting a portion of the ejecting tab 31, and a push rod 34 movably assembled to one of the guiding pillars 30 and interconnected with an end of the ejecting tab 31. The guiding pillars 30 together with the bridging bracket 33 are assembled to a connecting end 601 of an insulator 60 of a connector 6. The push rod 34 further includes a push button 301 for receiving an external force. When the push rod 34 is pushed toward the connector 6, the ejecting lab 31 will be pushed outward from the bridging bracket 33 thereby ejecting the inserted card therefrom.

However, when the conventional card cartridge connector is assembled to a notebook computer, a problem arises. As shown in FIG. 2A, the push button 301 is located within a perimeter 7a of a notebook computer 7 when no electrical card is inserted therein. As shown in FIG. 2B, when a card 8 is inserted, the ejecting tab (not shown) is pushed inward and the push rod 30 is accordingly moved outward. However, the push button 301 remains within the perimeter 7a of the notebook computer 7. Normally, the displacement of the push button 301 is only about 4 to 7 millimeters which inconveniences a user when ejecting the inserted card 8 since the user can only access the push button 301 by inserting his/her finger into a receiving slot of the notebook computer 7.

SUMMARY OF THE INVENTION

An objective of the present invention is to provide a retractable mechanism for use with a push rod which can increase the length of the push rod whereby a push button of the push rod extends beyond a perimeter of a notebook computer thereby facilitating easy manipulation of the push rod.

In order to achieve the objective set forth, a retractable mechanism for use with a push rod of a card cartridge connector comprises a first member adapted for assembly to an end of a push rod, and a second member receiving the first member therein. A positioning means selectively positions the second member between a first position in which the length of the push rod is extended, and a second position in which the length of the push rod is unchanged.

These and additional objects, features, and advantages of the present invention will become apparent after reading the following detailed description of the preferred embodiments of the invention taken in conjunction with the appended drawings.

BRIEF DESCRIPTION OF DRAWINGS

FIG. 2A is a top plan view of the connector of FIG. 1 in which a push rod is in a retracted position;

FIG. 2B is similar to FIG. 2A except the push rod is extended;

FIG. 5A is a top plan view of the connector of FIG. 4 wherein a push rod is in an extended position;

FIG. 5B is similar to FIG. 5A except the push rod is retracted;

FIGS. 6A to 6D are motional views showing the extension of a second member of a retractable mechanism in accordance with the present invention;

FIGS. 7A to 7E are motional views showing the retraction of a second member of the retractable mechanism;

DETAILED DESCRIPTION OF PREFERRED EMBODIMENT

Figure 1:
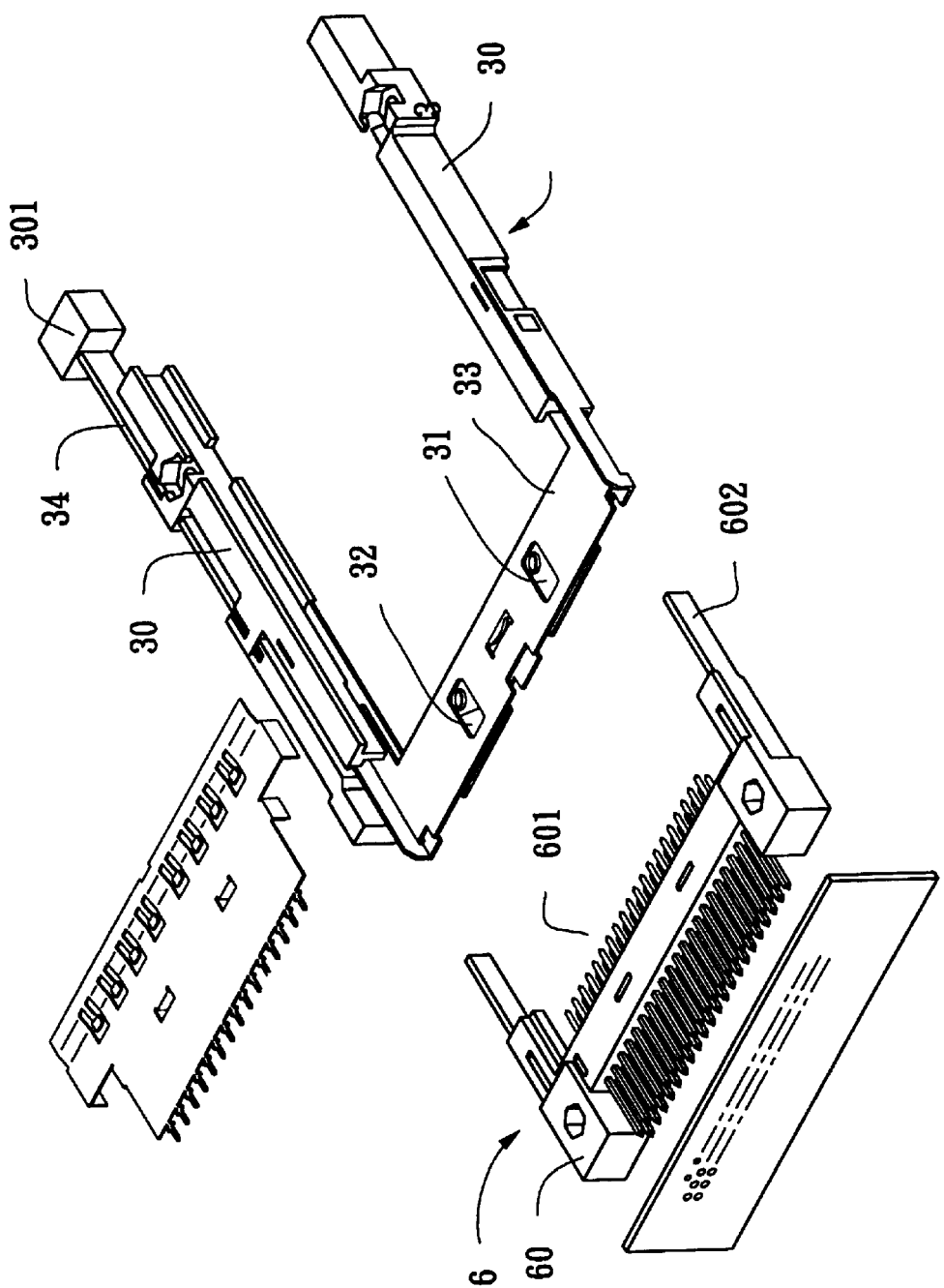
FIG. 1 is an exploded, perspective view of a conventional card cartridge connector.
Figure 3:
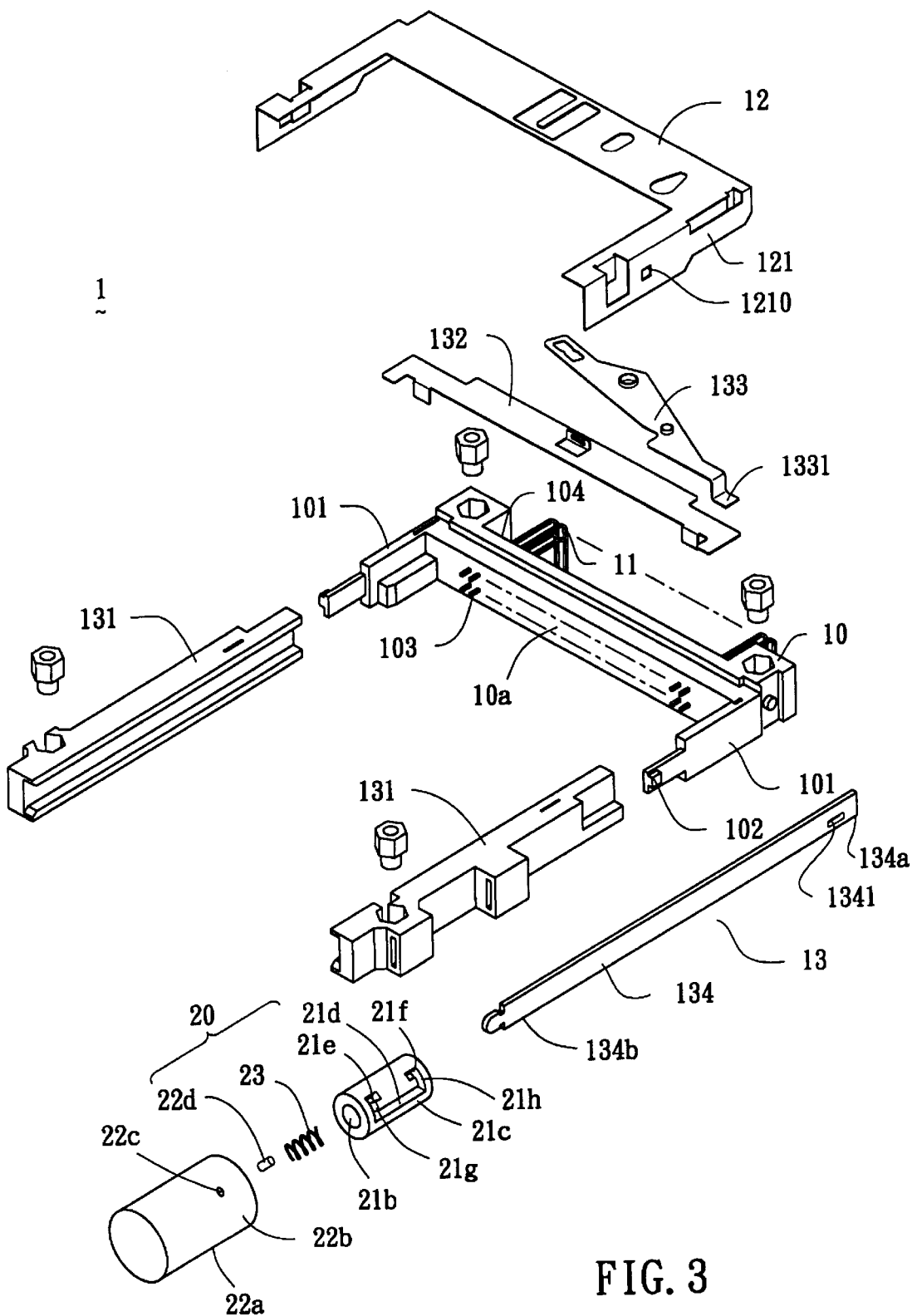
FIG. 3 is an exploded, perspective view of a card cartridge connector in accordance with the present invention.
Figure 3A:
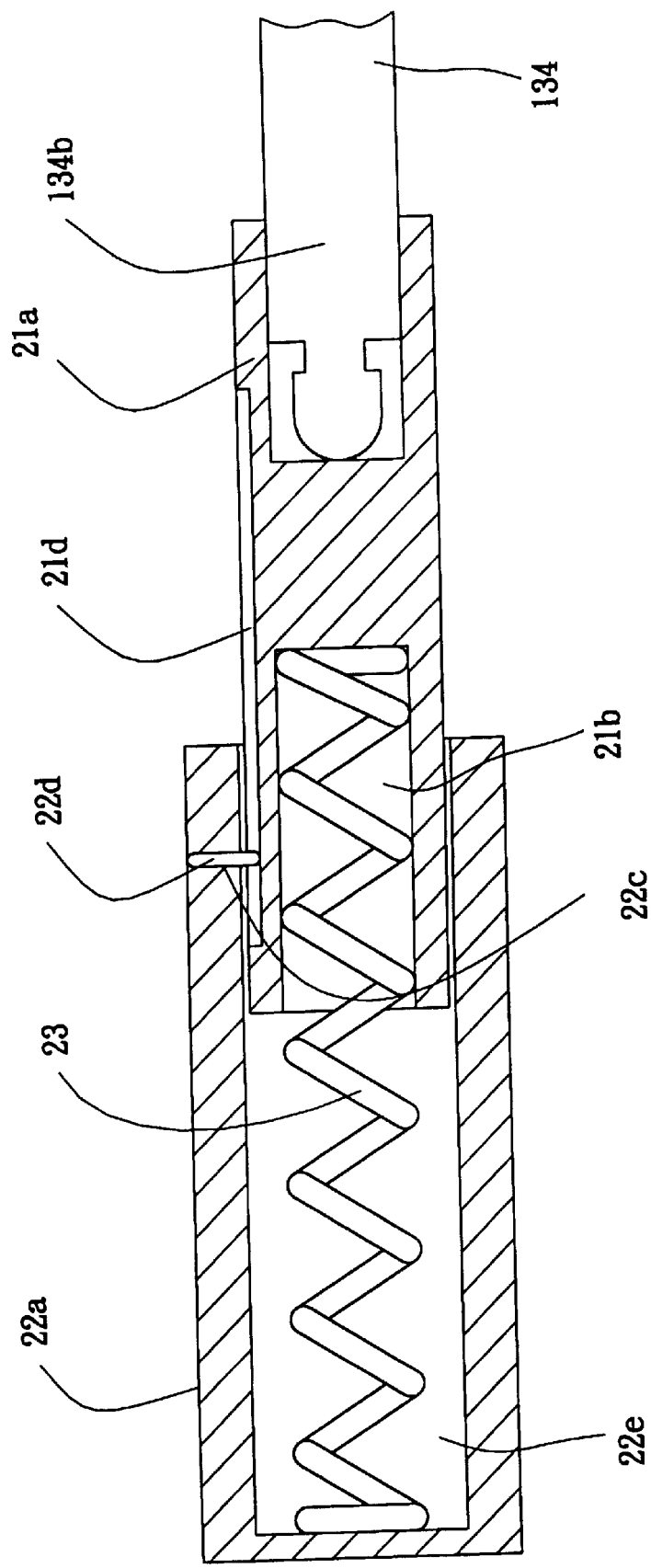
FIG. 3A is a partial cross-sectional view of the retractable mechanism of the connector of FIG. 3.
Figure 4:
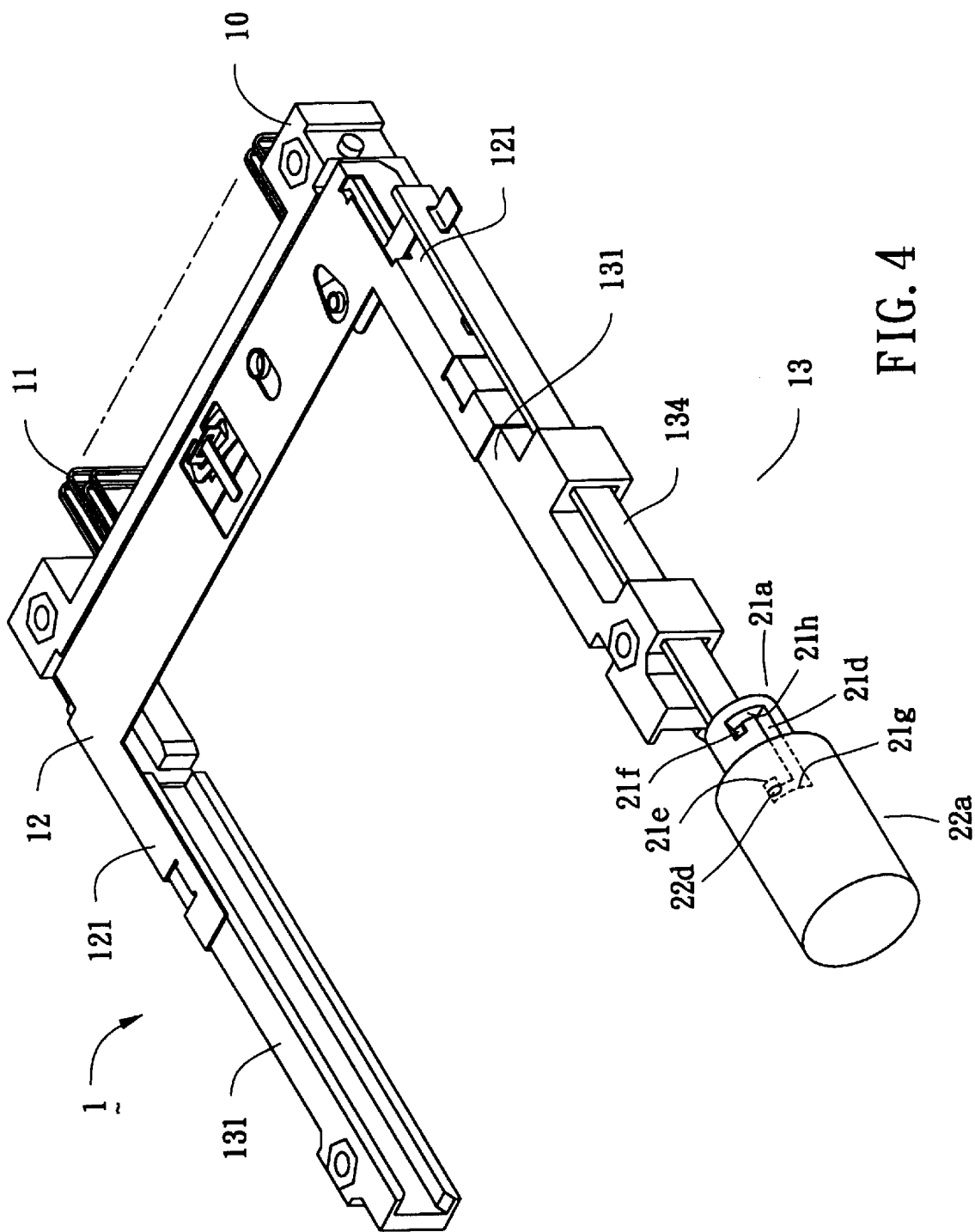
FIG. 4 is an assembled of FIG. 3.

Referring to FIGS. 3, 3A and 4, a card connector 1 generally comprises an insulative housing 10, a plurality of terminals 11, a fixing bracket 12, an ejecting mechanism 13, and a retractable mechanism 20. The housing 10 includes a pair of mounting rods 101 extending from traverse ends of the housing 10. Each mounting rod 101 forms a projection 102 for engaging with the ejecting mechanism 13. The housing 10 defines a plurality of passageways 10a each receiving one of the terminals 11 therein. Each terminal 11 has an L-shaped configuration and forms a mating end 103 and a tail end 104 for mounting to a printed circuit board (not shown). The fixing bracket 12 having contour similar to the housing 10 defines a clipping hole 1210 in each side 121 thereof for securely engaging with the projection 102 of the housing 10.

A pair of guiding pillars 131 are assembled to the mounting rod 101 of the housing 10. An ejecting tab 132 and a biasing rod 133 are assembled on an upper face of the housing 10. The ejecting tab 132, the biasing rod 133 and a push rod 134 are interconnected to form a linkage. An end 134a of the push rod 13 defines a window 1341 for receiving an end 1331 of the biasing rod 133. The push rod 13 forms a connecting end 134b for engaging with the retractable mechanism 20.

The retractable mechanism 20 for use with the push rod 134 comprises a first member 21a adapted to be assembled to the connecting end 134b of the push rod 134, and a second member 22a. The second member 22a defines a hollowed recess (FIG. 3A) for receiving the first member 21a therein.

The first member 21a defines a passage 21b for receiving a coil spring 23 therein. When the first member 21a is assembled to the end 134b of the push rod 134, the end 134b serves as a seat for the spring 23. When the spring 23 is assembled into the passage 21b of the first member 21a, the spring 23 projects outside of the first member 21a. An outer surface 21c of the first member 21a forms an elongate groove 21d. The elongate groove 21d defines a first traverse portion 21g and a second traverse portion 21h. A first notch 21e and a second notch 21f are formed in communication with the first traverse portion 21g and the second traverse portion 21h, respectively. The first and second notches 21e, 21f are offset from a longitudinal direction of the elongate groove 21d. The elongate groove 21d, the first and second traverse portions 21g, 21h, and the first and second notches 21e, 21f, and a guiding pin 22d jointly constitute a positioning means for selectively positioning said second member between a first position in which the second member 22a is extended, and a second position in which the second member 22a is retracted.

In order to selectively position the second member 22a between a first position (notch 21e) and a second position (notch 21f), an outer surface 22b of the second member 22a defines a hole 22c for receiving the guiding pin 22d therein. The guiding pin 22d projects to the recess of the second member 22a and is received in the elongate groove 21d of the first member 21a. By this arrangement, the second member 22a will not separate from the first member 21a.

As shown in FIG. 5A, when the second member 22a is at the first position, the length of the push rod 134 is extended whereby a portion of the second member 22a extends beyond a perimeter 7a of a notebook computer 7. When the second member 22a is pushed inward, the inserted card is ejected therefrom and the second member 22a is at the second position whereby no portion of the second member 22a projects beyond the perimeter 7a of the notebook computer 7, as seen from FIG. 5B. As a result, the end of the push rod 134 will not be damaged due to an unexpected external force acting on the second member 22a.

Referring to to FIGS. 6A to 6D, when the second member 22a is at the second position, the guiding pin 22d is positioned within the second notch 21f as the second member 22a is biased by the spring 23 (FIG. 6A). In ordei to release the guiding pin 22d from the second notch 21f, the second member 22a is pushed forward by an external force whereby the guiding pin 22d is released from the second notch 21f and enters into the second traverse portion 21h (FIG. 6B). The second member 22a is then rotated clockwise such that the guiding pin 22d moves from a left end to a right end of the second traverse portion 21h (FIG. 6C). When the external pushing force is released, the guiding pin 22d moves from an upper end of the elongate groove 21d to a lower end thereof. The second member 22a is rotated counterclockwise such that the guiding pin 22d moves from a right end of the second traverse portion 21g to a left end thereof (FIG. 6D). Tbe second member 22a can then be pushed inward to actuate the push rod 134 to eject an inserted card whereby the guiding pin 22d moves into the first notch 21e and the rotational movement of the second member 22a with respect to the first member 21a is hindered. Therefore, when an external force is applied to the second member 22a, the force can be effectively transmitted to the push rod 134.

Referring to FIGS. 7A to 7E, due to being biased by the spring 23, the guiding pin 22d rests at the left end of the first traverse portion 21g (FIG. 7A). Then the second member 22a is rotated clockwise such that the guiding pin 22d moves to the right end of the first traverse portion 21g (FIG. 7B). The second member 22a is then pushed such that the guiding pin 22d moves from a lower end to an upper end of the elongate groove 21d (FIG. 7C). When the second member 22d is rotated counterclockwise, the guiding pin 22d moves from a right end to a left end of the second traverse portion 21h (FIG. 7D). When release the second member 22a is released, the guiding pin 22d moves into the second notch 21f due to the biasing of the spring 23 acting on the second member 22a.

Figure 8:
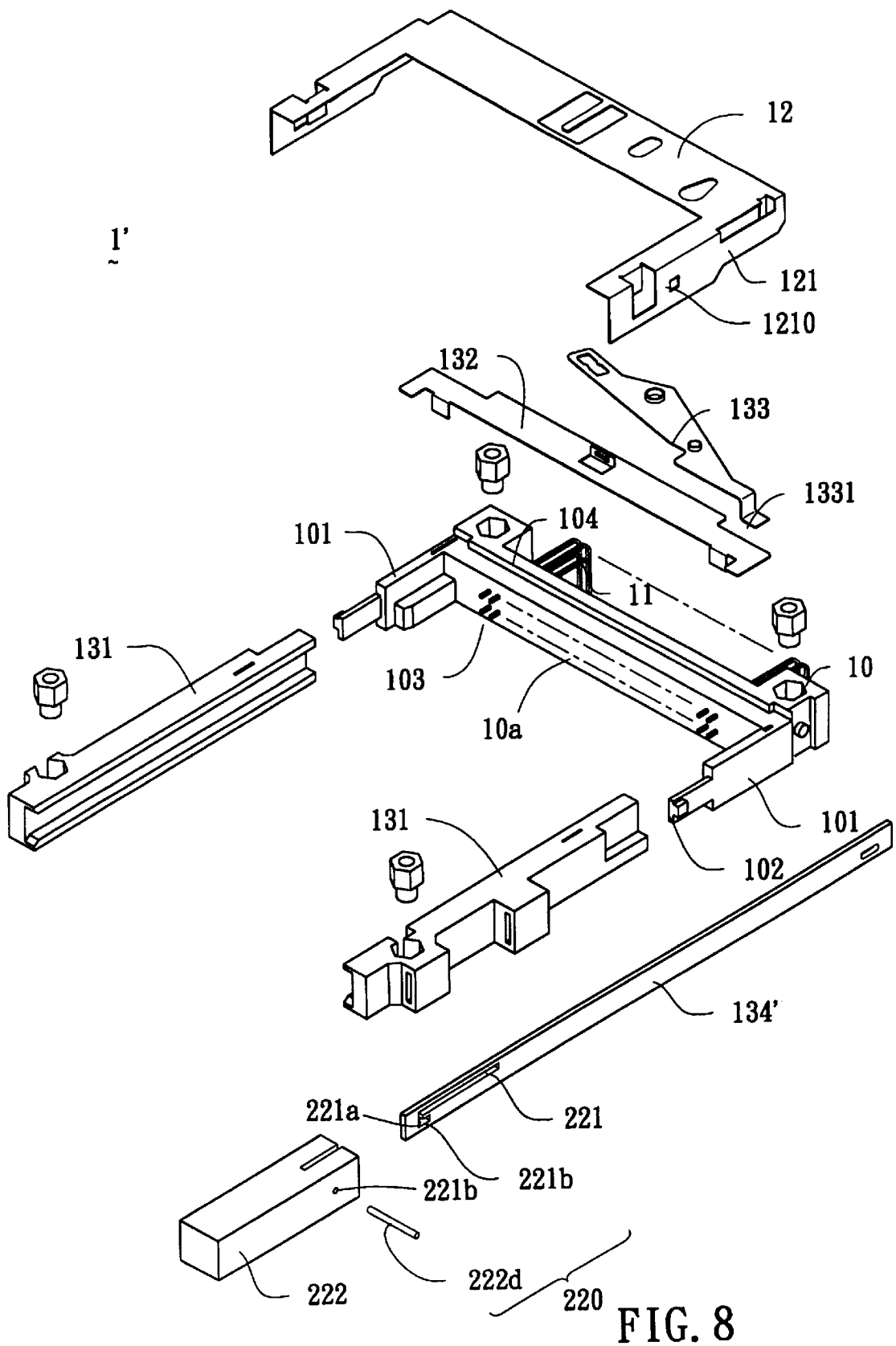
FIG. 8 is an exploded, perspective view of a second embodiment of a retractable mechanism in accordance with the present invention.

Referring to FIG. 8, a second embodiment of the retractable mechanism 220 is shown. In this embodiment, the retractable mechanism 220 includes an elongate groove 221 formed at an end 134a' of a push rod 134' and a second member 222. The elongate groove 221 defines a first traverse portion 221a and a first notch 221b offset from the elongate groove 221.

Figure 9A:
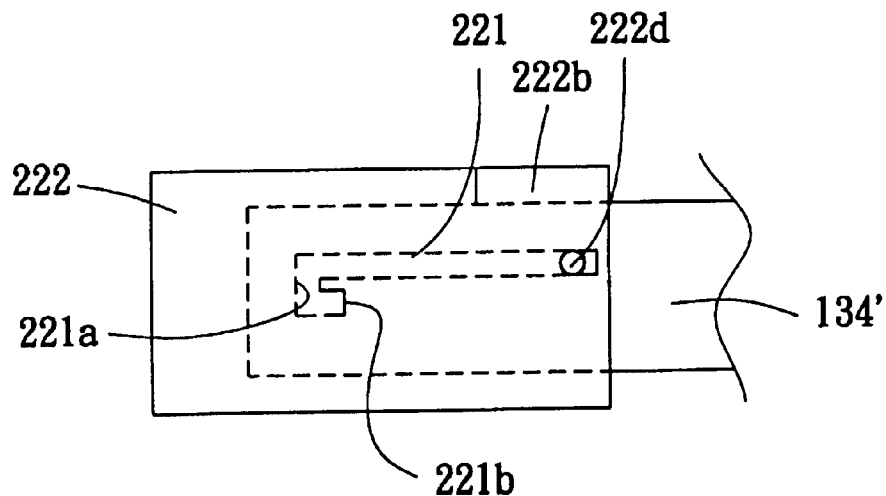
FIG. 9A is a top plan view of a push button of FIG. 8 in which the push rod is in a retracted position.
Figure 9B:
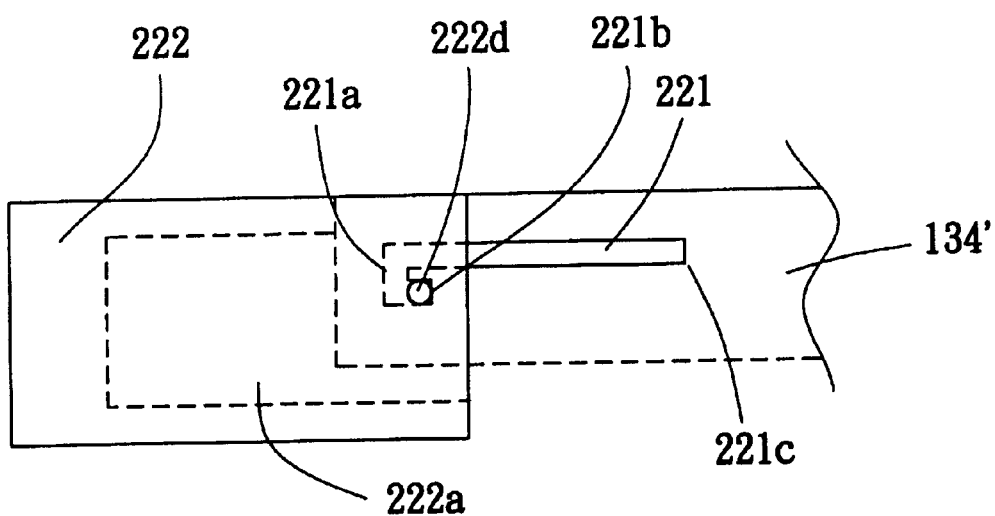
FIG. 9B is similar to FIG. 9A except the push rod is extended.

Also referring to FIGS. 9A and 9B, the second member 222 defines a recess 222a for receiving the end 134a' of the push rod 134' and a cutout 222b. The second member 222 further defines a hole 222c between the recess and an outer surface thereof for receiving a guiding pin 222d therein whereby the second member 222 is fixed to the end 134a' of the push rod 134'. Normally, the guiding pin 222d is located at an end 221c of the groove 221 and the second member 222 is at a retracted position. To eject an inserted card, the second member 222 can be pulled outward such that the guiding pin 222d enters from the first traverse portion 221a which causes the end 134a' of the push rod 134' to move into the cutout 222b of the second member 222. When the second member 222 is pushed, the guiding pin 222d moves into the first notch 221b and the actuating force can be effectively transferred to the push rod 134'.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims. Therefore, persons of ordinary skill in this field are to understand that all such equivalent structures are to be included within the scope of the following claims.

I claim:

1. A retractable mechanism for use with a push rod of a card connector, comprising:

a first member adapted to be assembled to an end of said push rod;

a second member defining a recess for receiving at least a portion of said first member; and positioning means for selectively positioning said second member between a first position in which said second member is extended away from said first member, and a second position in which said second member is retracted toward said first member and including an elongate groove defined in an outer surface of said first member, said groove forming a first traverse portion at an end thereof, said first traverse portion forming a first notch offset from said groove, and a second traverse portion opposite to said first traverse portion, said second traverse portion defining a second notch offset from said groove; and a guiding pin inserted into a hole defined in an outer surface of said second member and communicating with the recess thereof, wherein said guiding pin is received in said groove of said first member when said first member is received in the recess of said second member.

2. A retractable mechanism as recited in claim 1, wherein a spring is arranged between said first and second members whereby said second member is biased away from said push rod.

3. A retractable mechanism as recited in claim 1, wherein said first member is integrally formed with said end of said push rod.

4. A card connector, comprising:
- an insulative housing defining a plurality of passageways each receiving a terminal therein, a pair of guiding pillars extending from traverse ends of said housing;
- an ejecting mechanism assembled to said housing and having a push rod movably assembled to one of said guiding pillars; and
- a retractable mechanism assembled to said push rod, including a first member assembled to an end of said push rod;
- a second member defining a recess receiving at least a portion of said first member; and
- positioning means for selectively positioning said second member between a first position in which said second member is extended away from said first member, and a second position in which said second member is retracted toward said first member and including
- an elongate groove defined in an outer surface of said first member, said groove forming a first traverse portion at an end thereof, said first traverse portion forming a first notch offset from said groove, and a second traverse portion opposite to said first traverse portion, said second traverse portion defining a second notch offset from said groove; and
- a guiding pin inserted into a hole defined in an outer surface of said second member and communicating with the recess thereof, wherein said guiding pin is received in said groove of said first member when said first member is received in the recess of said second member.

5. A card connector as recited in claim 4, wherein a spring is arranged between said first and second members whereby said second member is biased away from said push rod.

6. A card connector as recited in claim 4, wherein said first member is integrally formed with the end of said push rod.

\* \* \* \* \*